3,057,562
RECOVERY OF SOYBEAN MEATS FROM SCREENINGS
Troy L. Fennig, Decatur, Ind., assignor to Central Soya Company, Inc., Decatur, Ind., a corporation of Indiana
No Drawing. Filed Feb. 20, 1961, Ser. No. 90,188
15 Claims. (Cl. 241—14)

This invention relates to the recovery of soybean meats from screenings, and the process is also useful in the recovery of meat fragments from other vegetable screening materials.

In the soybean treating processes, "screenings" represent the undersized fraction obtained from the cleaning operation of soybeans just before processing. After removing the oversized debris, the bean stream is rescreened to separate the whole soybeans from the meat fragments, hulls, weed seeds, and fine debris. Such separated materials are designated as "screenings." Typical screenings may contain as much as 30–35% soybean meats. Because of the large volume operation in soybean processing, there is an important economic factor in the successful recovery of meats from screenings.

Unfortunately, the constituents of "screenings" do not respond to the normal separating methods such as grinding, sizing, aspiration, specific gravity separation, etc. Possibly one reason is that many of the constituents have the same particle size and density.

I have discovered that by wetting the screenings by the addition of water, a change in the physical character of the ingredients occurs so that differential grinding becomes more effective and separation is somewhat more successful by screening and air table specific gravity separation. Mere water adjustment, although improving the process, did not result in the desired degree of separation required in an efficient plant operation. It was discovered, however, that by delivering moisture by steam conditioning, surprisingly higher meats concentrations and meats recoveries could be obtained than at the corresponding moisture levels achieved by water addition. Using as high as 15½% moisture gives only 70% meats concentration and less than 75% meats recovery while, at the same time, with only approximately 13% moisture levels after steam conditioning, approximately 80% meats concentration and better than 90% meats recovery could be observed. This would point to the fact that steam conditioning has an additional benefit beyond moisture adjustment. By adjusting the moisture content to at least 12%, and preferably within the range of 12 to 20%, by steam conditioning, the highly water absorbent, soft meat particles have a texture which responds to the grinding operation with the result that the particles respond in an entirely different manner in the sizing operation; such meat particles and the ground fibers, hard and less absorbent weed seeds, etc. now separate easily. This is due to the inherent cellular structure of the various constituents. Soybean meats are soft and pliable and hence difficult to grind, while weed seeds are very fibrous and fracture easily during the grinding step.

A primary object, therefore, of the invention is to provide a process whereby effective recovery of soybean meats from the other constituents of screenings is brought about. Another object is to provide a process in which the texture of soybean meats is changed so that an effective separation is accomplished between the meats and the other screening ingredients. A further object is to provide a process for steam conditioning soybean meats for changing the physical character of the meats and obtain maximal differences in the texture between meats and weed seeds by differential grinding. A still further object is to provide a process for the economical removal of soybean meats from screenings by employing a combination of steps such as sizing, steam conditioning, differential grinding, re-sizing, and specific gravity separation.

A further object is to provide an improved soybean meat product through the use of steam conditioning while at the same time modifying the texture of the soybean meats so that they respond to grinding and sizing separation from the other screening ingredients. Yet another object is to provide a process for adjusting the moisture content of screenings by the addition of steam to bring out differences in the texture between highly water absorbent, soft meat particles and fibrous, hard and less absorbent weed seeds whereby successful separation can be brought about. Other specific objects and advantages will appear as the specification proceeds.

In one embodiment of the invention, screenings, consisting of meat fragments, hulls, weed seeds, and fine debris, are sized on a U.S. standard mesh screen to separate fine material, and the remaining portion of the screenings which do not pass through the screen is wetted by the condensation of steam to bring the moisture content to 12%, and preferably above 12%. The moistened and conditioned material is then ground preferably in a screen mill. We prefer to employ a screen mill having about a ⅛–1/16″ screen. After grinding, successful separation of soybean meats from weed seed meats is achieved by screening through a mesh screen. In order to remove substantially all of such ingredients, we prefer to subject the material further to a specific gravity separation, as, for example, on an air table.

In the air tabling specific gravity separation, there is employed sufficient air flow to fluidize light fraction (tailings) and providing a deck surface having a deck angle of 5–10° and eccentric shakes 400–600 per minute for the free movement of particles. Such apparatus is well known, annd a further description herein is believed unnecessary. After the specific gravity separation, a soybean concentrate is obtained representing more than 95% of the total meats in the original screenings.

As a specific example, the screenings may be sized on a U.S. standard 20 mesh screen to remove fine particles (dust, redroot-pigweed, etc.). The +20 mesh fraction contains essentially all the meats from the original material, and represents 85–90% of the total weight. This +20 mesh fraction is then adjusted to a moisture content of 12–20% (preferred level, 15%) by steam conditioning. This adjustment brings out differences in texture between the highly water-absorbent soft meat particles, and fibrous, hard and less absorbent weed seeds. The adjustment of the moisture above at least 12% greatly accentuates these differences. While the adjustment by water addition results in some improvement in the recovery, it is necessray to steam condition for achieving high yields by changing the texture of the meat particles. Steam penetrates the portion of the spongy meats and swells the interior of the particles as well as its outer surface, while, at the same time, it does not modify greatly the texture of the weed seeds. Weed seeds preserve their rigidity because of their fibrous structure, even under intensive steam treatment. Steam conditioning, therefore, provides a most efficient way to obtain maximal differences in texture between meats and weed seeds by differential grinding.

In the use of steam, it is found that a 6–10 lb. charge of screenings can be treated adequately with a total of 4 lbs. of live steam delivered to a cooker at the rate of one pound per minute. If the cooker is jacketed, steam treatment can be applied to destroy the urease activity of the ingredients; this is an important factor if the meats are considered for direct feed usage. The live steam addition is then preferably followed by a cooking phase with the aid of indirect heat.

In the foregoing general description of the process, the percentage figures given are typical for screenings having a soybean meat content of approximately one-third. However, the relative percentage of meats in screenings can vary widely, depending on the cleaning practices of individual plants.

In the grinding operation, any suitable equipment may be employed. We prefer to employ a screen mill having a 1/8"–1/16" screen. Excellent results have been obtained by grinding in a hammermill through a screen having openings of 3/32" diameter.

The screening may also be accomplished in any suitable equipment, using mesh screens adapted for the separation of the ingredients. The mesh may vary widely, but we find generally that 25–32 mesh screens are satisfactory, a 30-mesh screen being prefererd. In the use of the 30-mesh screen, the plus fraction contains approximately 75% of the total screenings, and after the specific gravity separation, the soybean meat concentrate contains approximately 80% soybean meats which, as pointed out above, represents more than 95% of the total meats in the original screenings.

There are circumstances where the composition of "screenings" is such that the predominant contaminants are large weed seeds (milkvetch, Pennsylvania Persicaria, etc.). In this case, the "screenings" can be sized on 12 and 20 mesh screens. The −12 +20 mesh fraction is then channeled directly to the specific gravity separator, and only the +12 mesh fraction is led through the steam conditioning and grinding steps. After grinding, the product is rescreened on a 30 mesh screen and the +30 mesh fraction, containing the meats, is introduced into the specific gravity separator where it is combined with the stream representing the −12 +20 mesh fraction. Here, again, the meat concentrates in the heavy fraction while the tailings contain the light contaminants.

This alternate process has the advantage of requiring only one-half of the grinding capacity of the first process described above.

The following examples, which are illustrative of the invention but which should not be considered as limiting the scope of the invention, are set out:

EXAMPLE I

"Screenings" from the cleaning operation of soybeans prior to processing are sized on a U.S. Standard 20 mesh screen to remove extremely small weed seeds, dust, hull and stem fragments. A 10 lb. charge of the +20 mesh fraction is then agitated in a jacketed conditioner, where it is conditioned with direct steam at the rate of 60 lbs./hr. for 4 minutes along with indirect steam at the rate of 30 p.s.i.g. This direct steam addition causes a rapid rise in moisture (from 9% in the original screenings to 16.5% in the conditioned screenings) because of the steam condensation on the particles at temperatures below the boiling point of water. As the temperature reaches 215–220° F., further condensation of moisture is eliminated; however, the moisture continues to penetrate and soften the meat particles, making them spongy and pliable.

This conditioned material is then ground in a hammermill through a 3/32" screen, that is, a screen having a 3/32" screen opening. From the hammermill, it is sized on a U.S. Standard 30-mesh screen. The +30 mesh material, representing about 74% of the total screenings, is then air tabled on a Sutton, Steele and Steele specific gravity separator, Model V-80, using an embossed copper deck, a deck angle of 7°, air setting of 40, and an eccentric setting of 500 shakes/minute. This separation gave a meats concentrate (representing 44% of the starting material) with a purity of 80%; the recovery of meats was 95% based on the starting material.

The following table and flow sheet show in detail the foregoing example:

Table

| Product | Percent of Screenings | Assay Percent Soybean Meats | Percent Distribution Soybean Meats |
|---|---|---|---|
| Original Screenings | 100 | 32.0 | 100 |
| −20 Mesh Material | 13.3 | [1] N.D. | (²) |
| +20 Mesh Material | 86.7 | 36.9 | 99+ |
| After Conditioning and Grinding: | | | |
| −30 Mesh Material | 12.1 | [1] N.D. | (²) |
| +30 Mesh Material | 74.6 | 42.8 | 99+ |
| After Separation: | | | |
| Soybean Meats Concentrate | 44.1 | 80.0 | 95+ |
| Tailings | 30.5 | [1] N.D. | 5− |

[1] The percentage of meats in these fractions was considered negligible, therefore, no actual determinations were made.
[2] Negligible.

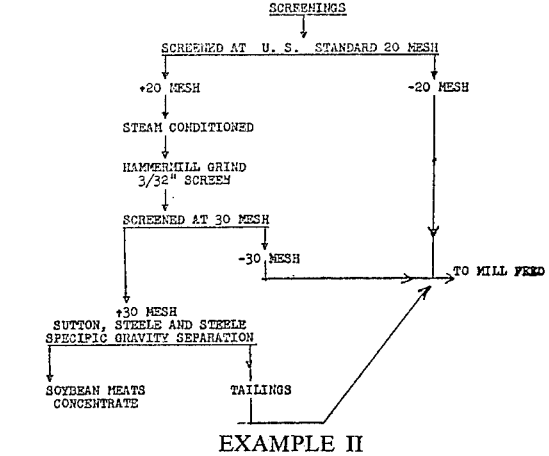

EXAMPLE II

"Screenings" from the cleaning operation of soybeans prior to processing are sized at U.S. Standard 12 and 20 mesh screens. Only the +12 mesh fraction is sent to the conditioner and conditioned as shown in Example I. After conditioning, grinding and sizing as shown in Example I, the +30 mesh material is again combined with the −12 +20 mesh material which had been originally screened out, and separated on the Sutton, Steele and Steele specific gravity separator as shown in Example I. This procedure gives meats concentrates of 70–75% grade, with recovery of total meats of around 90%. The separation on the air table is more difficult than it was in case of Example I and would require constant operator attention. This difficulty comes from the small weed seed and foreign material that go through into the −12 +20 mesh fraction and are, therefore, not influenced by the subsequent conditioning and grinding phase of the separation. However, there is a substantial saving in grinding capacity, since only part of the total feed stream goes through the grinding phase. The example is illustrated by the following flow sheet:

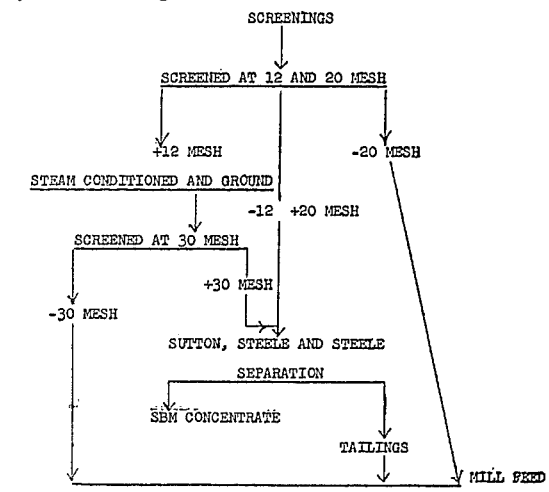

EXAMPLE III

"Screenings" having an original moisture content of 13% and a soybean meats concentration of 36.1% were adjusted to 5½ and 15½% moisture. The 5½% moisture sample was also steam treated, as in Example I, to obtain a final moisture content of 12.9%. All samples were ground, screened and air tabled as shown in Example I. The following is a tabular summary of the results (for comparison the results for the steam treated screenings in Example I are also included):

| Moisture Content | Meat Concentration, percent | Recovery Meats, percent |
|---|---|---|
| (1) 5½% (moisture obtained by drying) | 55.1 | 64.4 |
| (2) 12.0% (natural moisture) | 70.3 | 73.5 |
| (3) 15½% (adjusted by water addition) | 70.3 | 74.9 |
| (4) Steam Conditioned (5½% original moisture, 12.9% after conditioning) | 78.1 | 90.3 |
| (5) Steam Conditioned (9% original moisture, 16.5% after conditioning) | 80.0 | 95.0 |

In the foregoing specification, we have set forth specific procedure adapted for the treating and handling of typical screenings. Since, as already pointed out, the screenings in different plants may vary substantially because of the different cleaning and other conditions employed, changes may have to be made in the grinding operations and equipment employed and also in the mesh of the screens employed and in the use of other equipment to accommodate such differences. Such modifications, however, will be obvious, and while in the foregoing specification we have set forth specific structure and procedure in considerable detail for the purpose of illustrating one mode in which the invention may be practiced, it will be understood that such details may be varied widely by those skilled in the art without departing from the spirit of our invention.

I claim:

1. In a process for recovering soybean meats from screenings containing soybean meat fragments, weed seeds, and hull fragments, the steps of steam conditioning the screenings to raise the moisture content to at least 12%, grinding the moistened screenings, screening the ground material to remove the bulk of the non-meat material, and then subjecting the meat-containing plus mesh portion to a specific gravity separation to recover the soybean meats.

2. The process of claim 1 in which the screening is on a 25-32 mesh screen.

3. The process of claim 1 in which there is a preliminary screening on a 30-mesh screen and the plus fraction therefrom is subjected to the moisture treatment.

4. The process of claim 1 in which there is a preliminary screening on a 12-mesh and a 20-mesh screen and the fraction wetted is then the +12 mesh fraction.

5. The process of claim 1 in which said specific gravity separation is an air table separation.

6. In a process for recovering soybean meats from screenings containing soybean meat fragments, weed seeds, and hull fragments, and steps of steam conditioning the screenings to raise the moisture content to 12-20%, grinding the moistened screenings, screening the ground material to remove the bulk of the non-meat material, and then subjecting the meat-containing plus mesh portion to specific gravity air table separation to recover the soybean meats.

7. The process of claim 6 in which the moisture content is raised to about 15%.

8. In a process for recovering soybean meats from screenings containing soybean meat fragments, weed seeds and hull fragments, the steps of introducing live steam into the screenings to condense moisture thereon and to raise the moisture content to at least 12%, grinding the moistened screenings, screening the ground material to remove the bulk of the non-meat material, and then subjecting the meat-containing material to specific gravity separation to recover the soybean meats.

9. The process of claim 8 in which the moisture content is raised to 12-20%.

10. The process of claim 8 in which the steam conditioning is accomplished within a confined heated zone for the removal of urease.

11. In a process for recovering soybean meats from screenings containing soybean meat fragments, weed seeds and hull fragments, the steps of preliminarily sizing the screenings on a 30-mesh screen, steam conditioning the plus fraction to raise the moisture content to 12-20%, grinding the moistened screenings, screening the ground material to remove the bulk of the non-meat material, and then subjecting the meat-containing fraction to specific gravity air table separation to recover the soybean meats.

12. In a process for recovering soybean meats from screenings containing soybean meat fragments, weed seeds, and hull fragments, the steps of preliminarily sizing the screenings through a 12-mesh and a 20-mesh screen, steam conditioning hte +12 mesh fraction to a moisture content of at least 12%, grinding said +12 mesh fraction, screening the same on a 30-mesh screen, and finally sizing the plus fraction from said 30-mesh screen and the −12 and +20 fraction from said preliminary screening to a specific gravity air table separation to recover the soybean meats.

13. In a process for recovering soybean meats from screenings containing soybean meat fragments, weed seeds and hull fragments, the steps of steam conditioning the screenings to raise the moisture content to at least 12%, grinding the moistened screenings in a screen mill having a ⅛"–1/16" screen, sizing the ground material through a 25-32 mesh screen, and then subjecting the meat-containing plus meat portion to specific gravity separation for recovering the soybean meats.

14. The process of claim 13 in which the screen mill has a screen of 3/32" diameter.

15. The proces sof claim 13 in which the ground material is sized on a 30 mesh screen.

References Cited in the file of this patent

UNITED STATES PATENTS

| | | |
|---|---|---|
| 1,064,841 | Li | June 17, 1913 |
| 2,358,827 | Rakowsky et al. | Sept. 26, 1944 |